United States Patent [19]

Song

[11] Patent Number: 6,002,688
[45] Date of Patent: Dec. 14, 1999

[54] CIRCUIT FOR CALCULATING NUMBER OF IDLE VIRTUAL PATH IDENTIFIER AND VIRTUAL CHANNEL IDENTIFIER

[75] Inventor: Doug-Young Song, Seongnam, Rep. of Korea

[73] Assignee: SamSung Electronics Co., Ltd., Kyungki-do, Rep. of Korea

[21] Appl. No.: 08/874,130

[22] Filed: Jun. 12, 1997

[30] Foreign Application Priority Data

Jun. 12, 1996 [KR] Rep. of Korea ...................... 96-21055

[51] Int. Cl.[6] ....................................................... H04J 3/26
[52] U.S. Cl. .......................... 370/395; 370/392; 370/397; 370/399
[58] Field of Search ..................................... 370/395, 230, 370/231, 232, 233, 234, 235, 252, 253, 528, 397, 399

[56] References Cited

U.S. PATENT DOCUMENTS

| | | |
|---|---|---|
| 4,956,839 | 9/1990 | Torii et al. . |
| 5,119,369 | 6/1992 | Tanabe et al. . |
| 5,214,642 | 5/1993 | Kunimoto et al. . |
| 5,249,178 | 9/1993 | Kurano et al. . |
| 5,278,828 | 1/1994 | Chao . |
| 5,280,475 | 1/1994 | Yanagi et al. . |
| 5,280,483 | 1/1994 | Kamoi et al. . |
| 5,301,184 | 4/1994 | Uriu et al. . |
| 5,357,510 | 10/1994 | Norizuki et al. . |
| 5,412,648 | 5/1995 | Fan ........................................... 370/414 |
| 5,483,525 | 1/1996 | Song et al. ............................. 370/392 |
| 5,537,402 | 7/1996 | Notani et al. . |
| 5,544,169 | 8/1996 | Norizuki et al. ......................... 370/395 |
| 5,557,609 | 9/1996 | Shobataket et al. . |
| 5,570,361 | 10/1996 | Norizuki et al. ......................... 370/395 |

*Primary Examiner*—Chi H. Pham
*Assistant Examiner*—Frank Duong
*Attorney, Agent, or Firm*—Robert E. Bushnell, Esq.

[57] ABSTRACT

A circuit for calculating the number of idle virtual path identifiers and virtual channel identifiers which includes a counting unit for counting clock cycles indicating the number of idle virtual path identifiers and virtual channel identifiers, and clock cycles indicating the number of busy virtual path identifiers and virtual channel identifiers; and an operating unit for calculating the number of idle virtual path identifiers and virtual channel identifiers from the number of idle virtual path identifiers and virtual channel identifiers, and the number of busy virtual path identifiers and virtual channel identifiers, which were generated by the counting unit.

20 Claims, 3 Drawing Sheets

| VPI | | VCI | |
|---|---|---|---|
| 00000000 | B | 00000000 00000000 | B |
| 00000001 | B | 00000000 00000001 | B |
| 00000010 | B | 00000000 00000010 | B |
| 00000011 | B | 00000000 00000011 | B |
| 00000100 | B | 00000000 00000100 | B |
| : | | : | |
| : | | 00000001 00000010 | B |
| 00001001 | B | 00000001 00000011 | B |
| 00001010 | I | 00000001 00000100 | B |
| 00001011 | I | 00000001 00000101 | I |
| 00001100 | I | 00000001 00000110 | I |
| : | I | : | |
| 11111110 | I | 11111111 11111110 | I |
| 11111111 | I | 11111111 11111111 | B |

{ B : Busy ( IN USE )
{ I : Idle ( NOT IN USE )

FIG. 2

CIRCUIT FOR CALCULATING NUMBER OF IDLE VIRTUAL PATH IDENTIFIER AND VIRTUAL CHANNEL IDENTIFIER

CLAIM FOR PRIORITY

This application makes reference to, incorporates the same herein, and claims all benefits accruing under 35 U.S.C. §119 from an application for CIRCUIT FOR CALCULATING THE NUMBER OF IDLE VIRTUAL PATH IDENTIFIER AND VIRTUAL CHANNEL IDENTIFIER earlier filed in the Korean Industrial Property Office on Jun. 12, 1996, and there duly assigned Ser. No. 21055/1996.

BACKGROUND OF THE INVENTION

1. Technical Field

This invention relates to an asynchronous transfer mode (ATM) exchange system, and more particularly, relates to a circuit for calculating the number of idle virtual path identifiers and virtual channel identifiers in an ATM exchange system.

2. Related Art

Generally, ATM is a specific packet-oriented transfer mode using an asynchronous time division multiplexing technique where both line switching and packet switching are unified and many pieces of information such as voice, data, and pictures are organized in fixed-sized blocks, called cells. ATM can operate as both a packet exchange system and a circuit exchange system in one transmission mode for efficiently embodying both high speed and wide band communication networks. For this reason, ATM is a target transfer mode solution for implementing a broadband integrated services digital network (B-ISDN) whereas conventional synchronous transfer mode (STM) can only transmit subscribers information on channels having a fixed band.

Both ATM and STM have similarities, in that they transfer information in a digital format and support multiple channels for the flow of information. There is, however, one significant difference between the two systems relating to a method of assigning and identifying information channels. In STM, information is transferred through a fixed channel, where the channel is identified according to relative location of a frame pattern. If a channel is not transmitting information, the channel remains continuously assigned. Thus, in STM, the band channel is not effectively utilized. In ATM, on the other hand, a band channel is assigned only if there is information for transmission. Band channels that are not assigned can be used for information transmission by another subscriber. As a result, ATM offers a more effective channel management. Information channel identification in the ATM is embodied by the virtual path and virtual channel identifiers (hereinafter, referred to as "VPI & VCI") or similar connection identifiers which are placed in a header of each cell for identifying cells belonging to the same virtual channel on an asynchronous time division multiplex. Such channel identification of the ATM facilitates the use of a multiplex, de-multiplex and exchange of digital information, and serves to decrease the costs of broad-band communication network facilities because of its flexibility in a bandwidth distribution. Conventionally, there are a variety of ATM switching networks. Exemplary configurations are disclosed, for example, in U.S. Pat. No. 4,956,839 for ATM Switching System issued to Torii et al., U.S. Pat. No. 5,214,642 for ATM Switching System And Adaption Processing Apparatus issued to Kunimoto, U.S. Pat. No. 5,249,178 for Routing System Capable Of Effectively Processing Routing Information issued to Kurano et al., U.S. Pat. No. 5,280,475 for Traffic Shaping Method And Circuit issued to Yanagi et al., U.S. Pat. No. 5,280,483 for Traffic Control System For Asynchronous Transfer Mode Exchange issued to Kamoi et al., U.S. Pat. No. 5,301,184 for Control System For Switching Duplicated Switch Units In ATM Exchange issued to Uriu et al., U.S. Pat. No. 5,357,510 for Apparatus And A Method For Supervising And Controlling ATM Traffic issued to Norizuki, U.S. Pat. No. 5,537,402 for ATM Switch issued to Notani et al., and U.S. Pat. No. 5,557,609 for Switching Apparatus for ATM issued to Shobatake et al.

In a communication system or switching system using the ATM, a call processing unit must assign the VPI and VCI to each ATM cell whenever the subscriber requires a call connection. The VPI and VCI assignment is accomplished by reading in the order of VPI and VCI which are not under assignment every time the subscriber requires a call connection as disclosed, for example, in U.S. Pat. No. 5,119,369 for "Packet Switch Communication Network Using Packet Having Virtual Channel Identifier" issued to Tanabe et alii. A call which receives the assignment of the VPI and VCI placed in a header area of an ATM cell is then transferred through a transferring channel. Assigning VPI and VCI for call connection is, however, extremely burdensome to the call processing unit. This is because the call processing unit must search for available VPI and VCI values whenever a call is made. At an initial stage of assignment, it may be easy to sequentially allot values to VPI and VCI responding to the call connection requirement. After assigning values to all VPIs and VCIs to be utilized, however, the call processing unit must check for idle VPI and VCI. When there is a call, the ATM network must manage the number of VPI and VCI, which are used for connecting a call, and the number of idle VPI and VCI available.

Conventional ATM switching system includes a VPI and VCI table for indicating the status of each VPI and VCI. Busy VPI and VCI are counted to check how many VPI and VCI are in use. Idle VPIs and VCIs are also counted. Busy VPIs and VCIs, and idle VPIs and VCIs are managed within the table. The status of VPI and VCI are monitored by counting busy VPIs and VCIs and idle VPIs and VCIs where necessary. Generally, there are few problems in counting busy and idle VPIs and VCIs when a small number of VPIs and VCIs are utilized. However, as the number of VPIs and VCIs utilized increases, it becomes more difficult to count busy and idle VPIs and VCIs. Thus, it takes longer to perform this operation, and management cannot be performed efficiently.

SUMMARY OF THE INVENTION

Accordingly, it is therefore an object of the present invention to provide a simple circuit for calculating the number of VPIs and VCIs for processing a call in an ATM switching system.

It is also an object to provide a circuit for rapidly counting idle VPIs and VCIs using an idle VPI and VCI selection technique.

These and other objects of the present invention can be achieved by a circuit for calculating a number of idle virtual path identifiers and virtual channel identifiers which includes a counting unit for counting clock cycles indicating a number of idle virtual path identifiers and virtual channel identifiers, and for counting clock cycles indicating a number of busy virtual path identifiers and virtual channel identifiers; and an operating unit for calculating the number of idle virtual path identifiers and virtual channel identifiers from the counted values of the idle virtual path identifiers and virtual channel identifiers and the counted values of the busy virtual path identifiers and virtual channel identifiers, which are generated by the counting unit.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 2 illustrates a table used for managing the number of idle virtual path identifiers and virtual channel identifiers.

DETAILED DESCRIPTION OF THE PREFERRED EMBODIMENT

Figure 1:
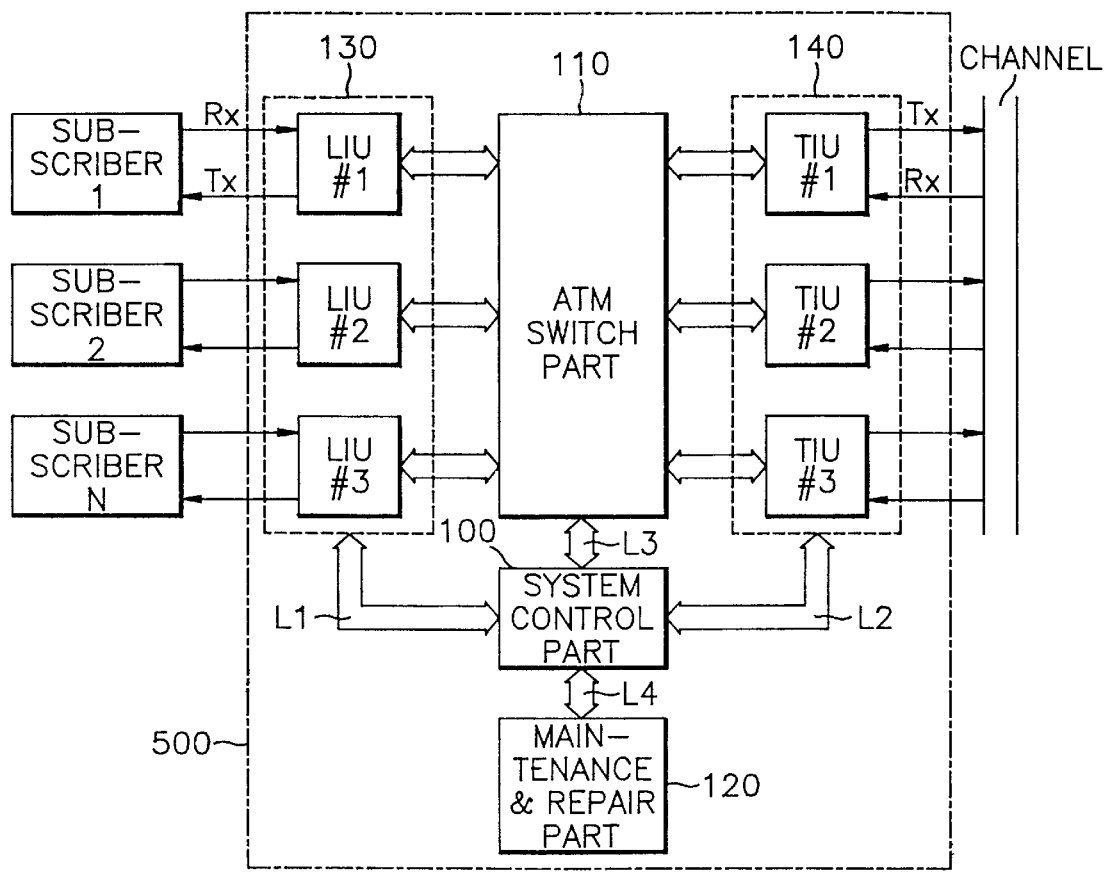
FIG. 1 is a block diagram of an asynchronous transfer mode (ATM) switching system according to the principles of the present invention.

Referring now to the drawings and particularly to FIG. 1, which illustrates a circuit structure of an asynchronous transfer mode (ATM) switching system applicable to the present invention. ATM switching system 500 includes a system control part 100, an ATM switch part 110, a maintenance and repair part 120, a line interface part 130 and a trunk interface part 140, for transferring calls generated from any one of subscribers to another ATM switching system through an ATM channel and for connecting a call received through the ATM channel to any one of the subscribers. System control part 100 controls entire exchanging operation of the ATM switching system 500 and enables communication with a controller placed within the line and trunk interface parts 130 and 140. System control part 100 also performs a call admission control function (CAC) for determining whether to admit a call from a subscriber terminal, requesting a connection through a transmission line to another subscriber terminal, based on described parameters representative of attributes of the requesting call, i.e., the calling subscriber terminal, such as service bandwidth, transfer delay, cell loss rate, peak speed of data, average speed of data, burst ratio and so forth. Upon admittance of a call, the system control part 100 further performs a congestion control function (CC) for determining whether congestion of traffic occurs in order to maintain the service quality within the described parameters. In addition, the system control part 100 may assign virtual path identifiers (VPI) and virtual channel identifiers (VCI) in a header area of an ATM cell which is dependent upon its bandwidth and a connection requirement of a call. System control part 100 is electrically connected to the ATM switch part 110, the maintenance and repair part 120, the line interface part 130 and the trunk interface part 140 through transmission lines L1 to L4, for exchanging data as well as generating control signals to the respective line interface part 130, trunk interface part 140, ATM switch part 110 and the maintenance and repair part 120.

ATM switch part 110 is used to execute a switching function of the ATM cell in response to control signals provided from the system control part 100. The ATM switch part 110 is comprised of a time division switch and a space division switch; and a total switching number within the ATM switch part 110 is set to correspond to the number of subscribers, trunks within the trunk interface part 140 and others ports.

Maintenance and repair part 120 is used to execute a whole management, maintenance and repair function under control of the system control part 100. The maintenance and repair function includes checking the status of transmission lines, detecting transmission errors and making a hindrance recovery. In connection with the ATM function, resource management of ATM cells and data base management of subscribers are also included in order to facilitate the operation of an ATM switching system.

Line interface part 130 consists of a plurality of lines interface units (LIU#1–LIU#N) coupled to a corresponding plurality of subscriber terminals 1, 2 . . . N, for connecting between a plurality of subscriber lines from subscriber terminals 1, 2 . . . N via the ATM switch part 110. Thus, the line interface part 130 enables communication between subscribers within an ATM switching system. In addition, the line interface part 130 also performs a number of well-known functions according to an ATM physical dependent layer, and an ATM layer that is common to all services with cell transfer capabilities, as well as an ATM adaptation layer (AAL) that is service-dependent. Further, the line interface part 130 performs a usage parameter control function (UPC) for monitoring whether a subscriber is transmitting information in connection with the call on the basis of parameter values set by the subscriber when the call admission control function (CAC) is performed.

Trunk interface part 140 consists of a plurality of trunk interface units (TIU#1–TIU#L) is coupled to an ATM channel via a plurality of trunk lines, for connecting ATM cells of another switching system through the ATM channel. Thus, the trunk interface part 140 enables communication between two different ATM switching systems via an ATM switch part 110.

When there is a call from a subscriber, the ATM switching system must manage the number of VPIs and VCIs which are used for call connection, and the number of idle VPIs and VCIs available. A VPI and VCI table as shown in FIG. 2 is generally used to indicate the status of each VPI and VCI. Busy VPI and VCI are counted to check how many VPI and VCI are in use. Idle VPIs and VCIs are also counted. Busy VPIs and VCIs, and idle VPIs and VCIs are managed within the table. The status of VPI and VCI are monitored by counting busy VPIs and VCIs and idle VPIs and VCIs where necessary. As shown in FIG. 2, the status of VPI and VCI are marked with "B" for indicating a busy state and "I" for indicating an idle state, and the number of "B" and "I" can be counted when necessary in the conventional ATM switching system to check how many VPI and VCI are in use and how many VPI and VCI are idle.

Generally, there are few problems in counting busy and idle VPIs and VCIs when a small number of VPIs and VCIs are utilized. However, as the number of VPIs and VCIs utilized increases, it becomes more difficult for the ATM switching system to count busy and idle VPIs and VCIs. Thus, it takes longer to perform this operation, and management cannot be performed efficiently.

Figure 3:
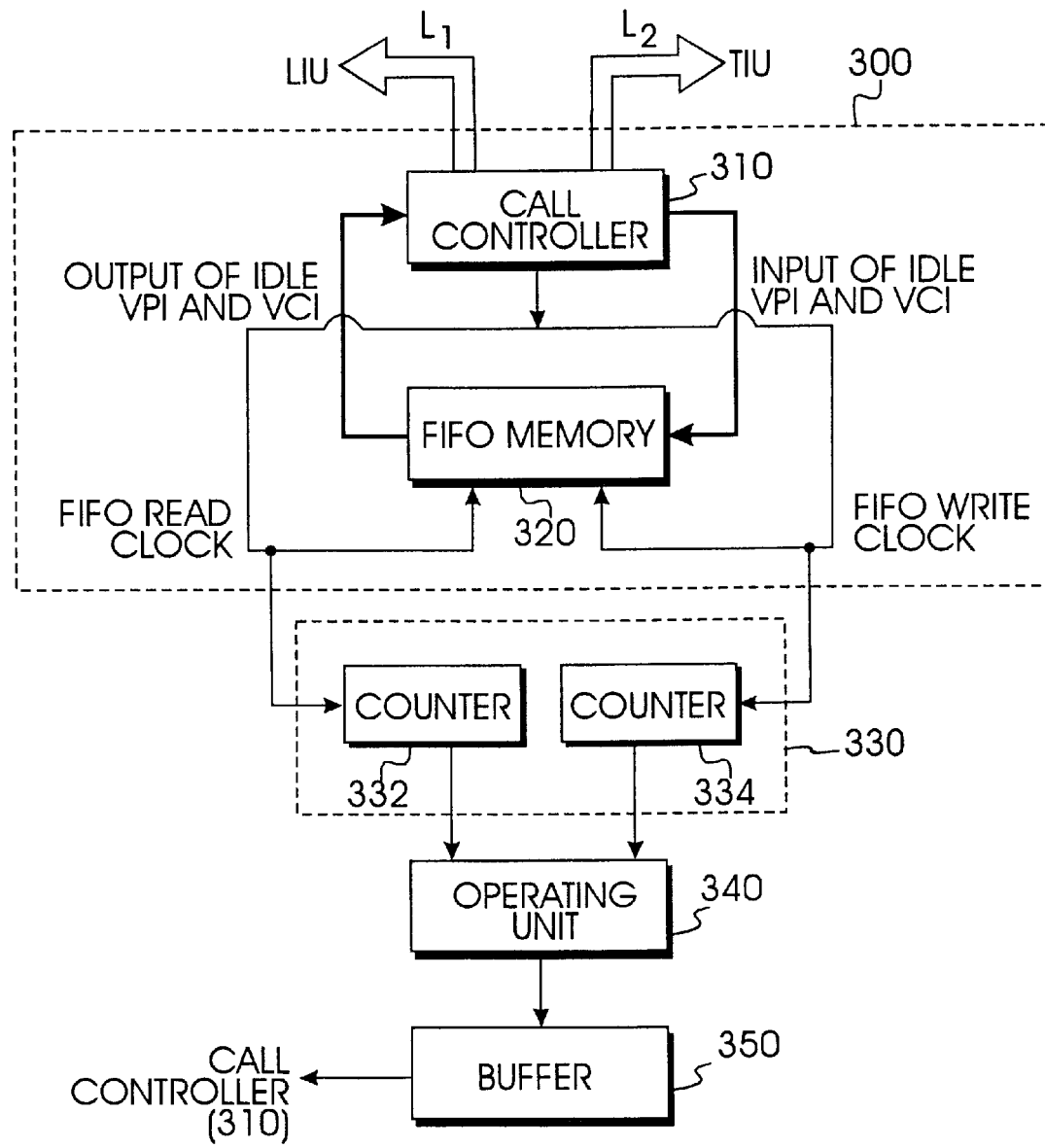
FIG. 3 is a block diagram of a circuit for calculating a number of idle virtual path identifiers and virtual channel identifiers according to the present invention.

Turning now to FIG. 3, which illustrates a circuit for calculating a number of idle VPIs and VCIs in an ATM switching system constructed according to the principles of the present invention. The circuit includes an idle VPI and VCI selecting unit 300, a counting unit 330, an operating unit 340 and a buffer 350. The idle VPI and VCI selecting unit 300 includes a call controller 310 and a memory 320. Memory 320 has a first-in first-out (FIFO) function, which stores idle VPI and VCI information in response to a FIFO write clock signal. Similarly, the memory 320 enables reading operations in response to a FIFO read clock signal. Call controller 310 generates the FIFO write and read clock signals, in response to the call connection requirements of the interface components, i.e., line interface unit LIU and trunk interface unit TIU through lines L1 and L2 of the ATM switching system, and transmits the information regarding idle VPI and VCI read from memory 320 to the interface components of the ATM switching system. Call controller 310 also generates FIFO read and write clock signals, in response to call cancellations, and transmits the information regarding the idle VPI and VCI utilized to cancel the call to memory 320.

Since the idle VPI and VCI selecting unit 300 is fully disclosed in Korean Application No. 93-31307 and its corresponding U.S. application Ser. No. 08/265,849 by Applicant which later issued as U.S. Pat. No. 5,483,525, its detailed circuit construction as disclosed therefrom is incorporated by reference herein for the sake of brevity. It is noted, however, that the idle VPI and VCI selecting unit 300 may be installed inside or on the outside of the system control part 100 of the ATM switching system in order to implement the VPI and VCI assignment operation. The FIFO read clock signal used by idle VPI and VCI selecting unit 300, is intended for reading idle VPI and VCI from memory 320 and for assigning values to idle VPI and VCI, identifying the connection of a call when another call connection is required.

Counting unit 330 includes a first counter 332 for counting the FIFO read clock signal to calculate the number of busy VPIs and VCIs, and a second counter 334 for counting the FIFO write clock signal to calculate the number of idle VPIs and VCIs. Operating unit 340, subtracts the number of busy VPI and VCI, which are counted by the first counter 332, from an initial total number of idle VPIs and VCIs, to these results are added the number of the idle VPI and VCI, which is counted by the second counter 334, to calculate the number of currently idle VPIs and VCIs. The number of idle VPIs and VCIs is stored in buffer 350. The number of idle VPIs and VCIs is transmitted from buffer 350 to call controller 310, and is utilized in managing the idle VPIs and VCIs.

As described above, the circuit as constructed according to the present invention rapidly calculates the number of idle VPIs and VCIs, and rapidly assigns idle VPIs and VCIs in order to efficiently manage the VPIs and VCIs in processing a call. Since this invention has a simple circuit configuration, its production cost is reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit for calculating a number of idle virtual path identifiers and virtual channel identifiers, comprising:
    a counting unit for counting first clock cycles indicating a number of idle virtual path identifiers and virtual channel identifiers, and second clock cycles indicating a number of busy virtual path identifiers and virtual channel identifiers;
    an operating unit for calculating said number of idle virtual path identifiers and virtual channel identifiers from counted values of idle virtual path identifiers and virtual channel identifiers, and counted values of busy virtual path identifiers and virtual channel identifiers generated by said counting unit; and
    a control unit for outputting said first and second clock cycles to said counting unit, wherein said first clock cycles correspond to write clock signals and said second clock cycles correspond to read clock signals.

2. The circuit of claim 1, further comprised of said operating unit subtracting the number of busy virtual path identifiers and virtual channel identifiers, from the sum of the number of idle virtual path identifiers and virtual channel identifiers, and the number of virtual path identifiers and virtual channel identifiers.

3. The circuit of claim 2, further comprising a memory having a first-in-first-out function, said memory enabling writing operations in response to said write clock signals outputted from said control unit.

4. The circuit of claim 1, further comprised of said counting unit including a first counter for counting said first clock cycles indicating a number of idle virtual path identifiers and virtual channel identifiers to produce the count values of idle virtual path identifier and virtual channel identifiers, and a second counter for counting said second clock cycles indicating a number of busy virtual path identifiers and virtual channel identifiers to produce the count values of busy virtual path identifiers and virtual channel identifiers.

5. The circuit of claim 1, wherein the virtual path identifiers identify different ones of virtual paths and the virtual channel identifiers identify different ones of virtual channels in a corresponding virtual path.

6. The circuit of claim 1, further comprising a memory having a first-in-first-out function, said memory enabling reading operations in response to said read clock signals outputted from said control unit.

7. A broadband communication system, comprising:
    line interface means for interfacing with a plurality of subscriber lines from corresponding subscriber terminals;
    trunk interface means each for interfacing with a plurality of trunk lines from a communication channel;
    asynchronous transfer mode switch means having a plurality of pairs of input and output lines operatively connected between said line interface means and said trunk interface means, for selectively switching between subscriber lines for enabling communication between subscribers, and for enabling communication with another broadband communication system via said communication channel; and
    assignment means for assigning, in correspondence with a connection requirement of a call, header values representing virtual path and virtual channel identifiers for identifying one of virtual paths in a transmission line and for identifying one of virtual channels in each virtual path corresponding to the call to be placed in a header area of asynchronous transfer mode cells, said assignment means further determining a number of idle virtual path and virtual channel identifiers for call management after said assignment, said assignment means including:
- a counting unit for counting clock cycles indicating a number of idle virtual path identifiers and virtual channel identifiers, and clock cycles indicating a number of busy virtual path identifiers and virtual channel identifiers;
- an operating unit for calculating the number of idle virtual path identifiers and virtual channel identifiers from counted values of idle virtual path identifiers and virtual channel identifiers, and counted values of busy virtual path identifiers and virtual channel identifiers, which are generated by the counting unit; and
- a control unit for outputting said first and second clock cycles to said counting unit, wherein said first clock cycles correspond to write clock signals and said second clock cycles correspond to read clock signals.

8. The broadband communication system of claim 7, further comprised of said operating unit subtracting the number of busy virtual path identifiers and virtual channel identifiers, from the sum of the number of idle virtual path identifiers and virtual channel identifiers, and the number of virtual path identifiers and virtual channel identifiers.

9. The system of claim 8, further comprising a memory having a first-in-first-out function, said memory enabling writing operations in response to said write clock signals outputted from said control unit.

10. The broadband communication system of claim 7, further comprised of said counting unit including a first counter for counting said first clock cycles indicating a number of idle virtual path identifiers and virtual channel identifiers to produce the count values of idle virtual path identifier and virtual channel identifiers, and a second counter for counting said second clock cycles indicating a number of busy virtual path identifiers and virtual channel identifiers to produce the count values of busy virtual path identifiers and virtual channel identifiers.

11. The system of claim 7, wherein the virtual path identifiers identify different ones of virtual paths and the virtual channel identifiers identify different ones of virtual channels in a corresponding virtual path.

12. The system of claim 7, further comprising a memory having a first-in-first-out function, said memory enabling reading operations in response to said read clock signals outputted from said control unit.

13. A process for calculating a number of idle virtual path identifiers and virtual channel identifiers, comprising:

counting first clock cycles indicating a number of idle virtual path identifiers and virtual channel identifiers, and second clock cycles indicating a number of busy virtual path identifiers and virtual channel identifiers;

calculating said number of idle virtual path identifiers and virtual channel identifiers from the counted values of idle virtual path identifiers and virtual channel identifiers, and the counted values of busy virtual path identifiers and virtual channel identifiers; and outputting said first and second clock cycles to a counting unit, wherein said first clock cycles correspond to write clock signals and said second clock cycles correspond to read clock signals.

14. The process of claim 13, further comprised of subtracting the number of busy virtual path identifiers and virtual channel identifiers from the sum of said number of idle virtual path identifiers and virtual channel identifiers, and a number of virtual path identifiers and virtual channel identifiers.

15. The process of claim 13, further comprised of:

counting said first clock cycles indicating a number of idle virtual path identifiers and virtual channel identifiers to produce the count values of idle virtual path identifier and virtual channel identifiers; and counting said second clock cycles indicating a number of busy virtual path identifiers and virtual channel identifiers to produce the count values of busy virtual path identifiers and virtual channel identifiers.

16. The process of claim 13, further comprising writing idle virtual path identifier information and idle virtual channel identifier information in response to said write clock signals.

17. The process of claim 16, further comprising reading idle virtual path identifier information and idle virtual channel identifier information in response to said read clock signals.

18. The process of claim 13, wherein the virtual path identifiers identify different ones of virtual paths and the virtual channel identifiers identify different ones of virtual channels in a corresponding virtual path.

19. The process of claim 18, further comprising writing idle virtual path identifier information and idle virtual channel identifier information to a memory in response to said write clock signals.

20. The process of claim 19, further comprising reading idle virtual path identifier information and idle virtual channel identifier information from said memory in response to said read clock signals.

* * * * *